July 10, 1945.  L. U. LARKIN  2,379,973
APPARATUS FOR THE MANUFACTURE OF FINNED STRUCTURES
Original Filed March 19, 1938  11 Sheets-Sheet 1
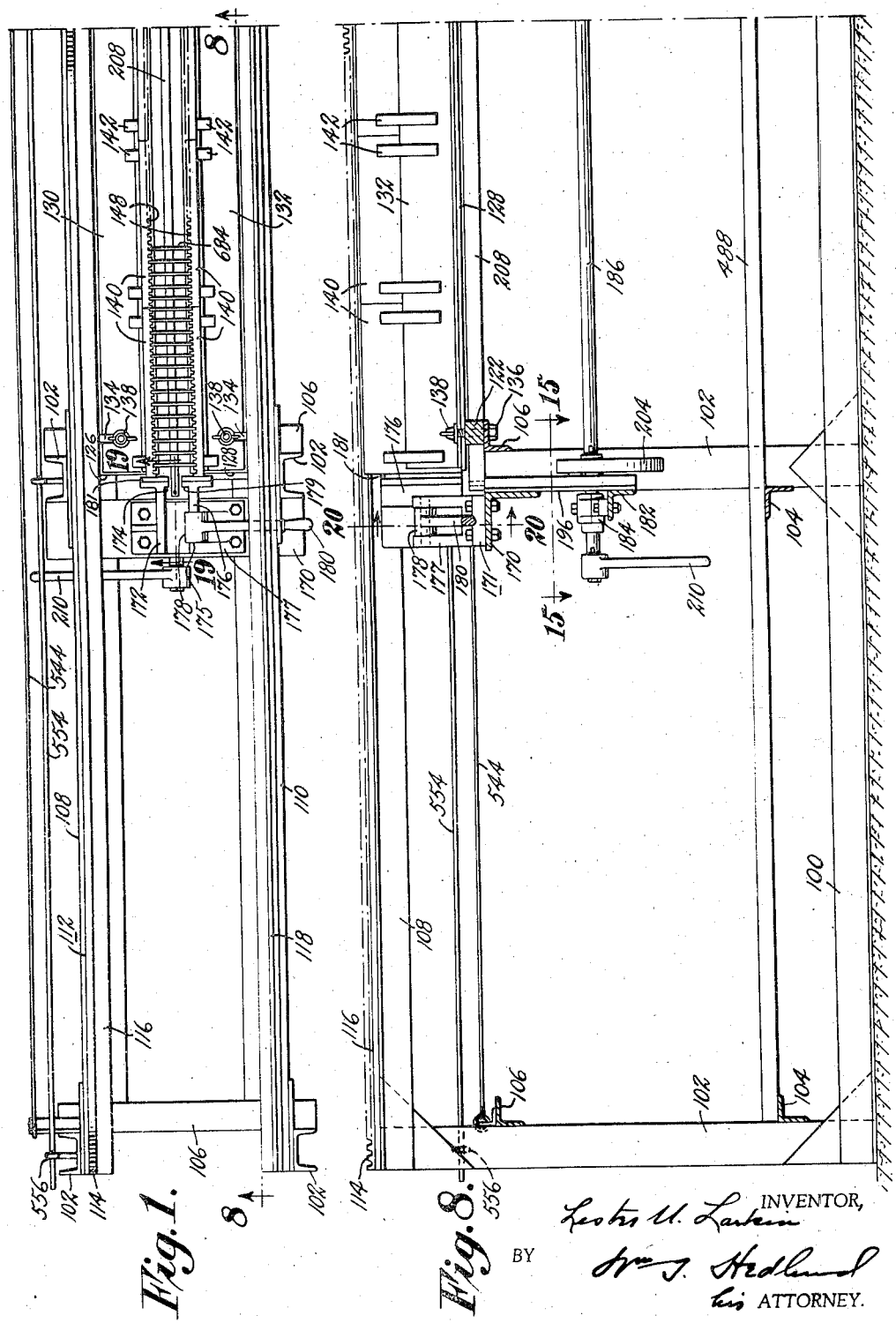

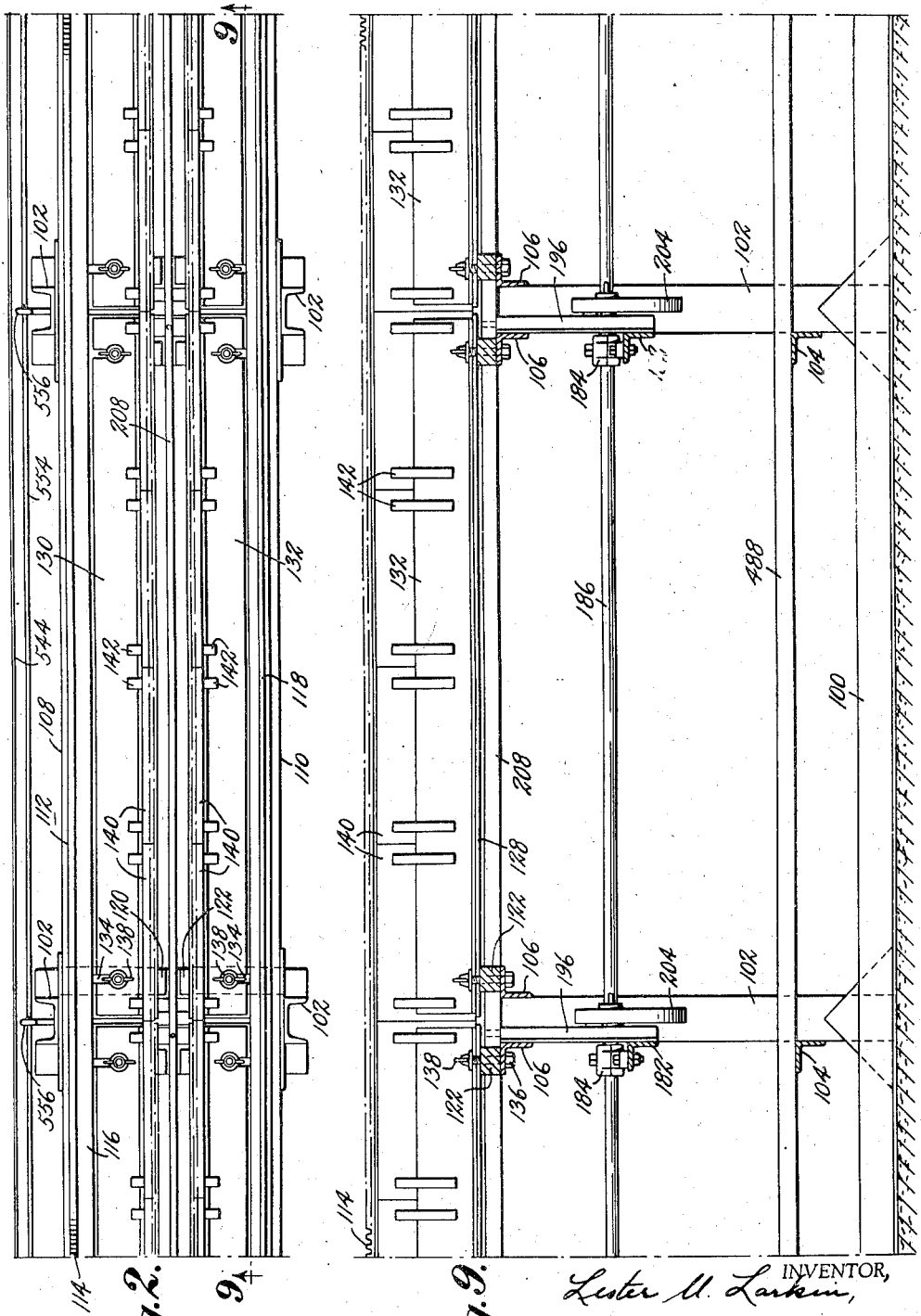

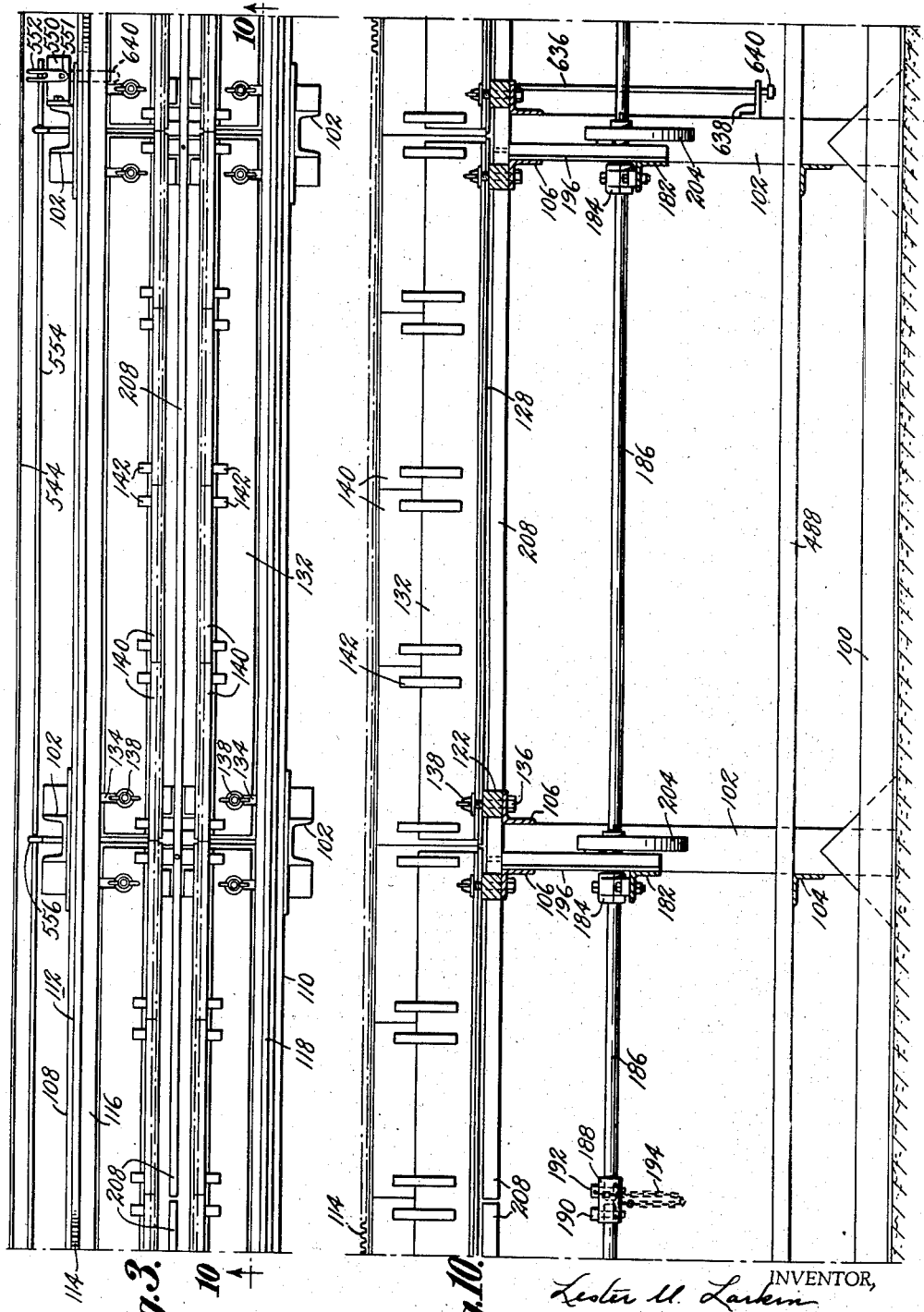

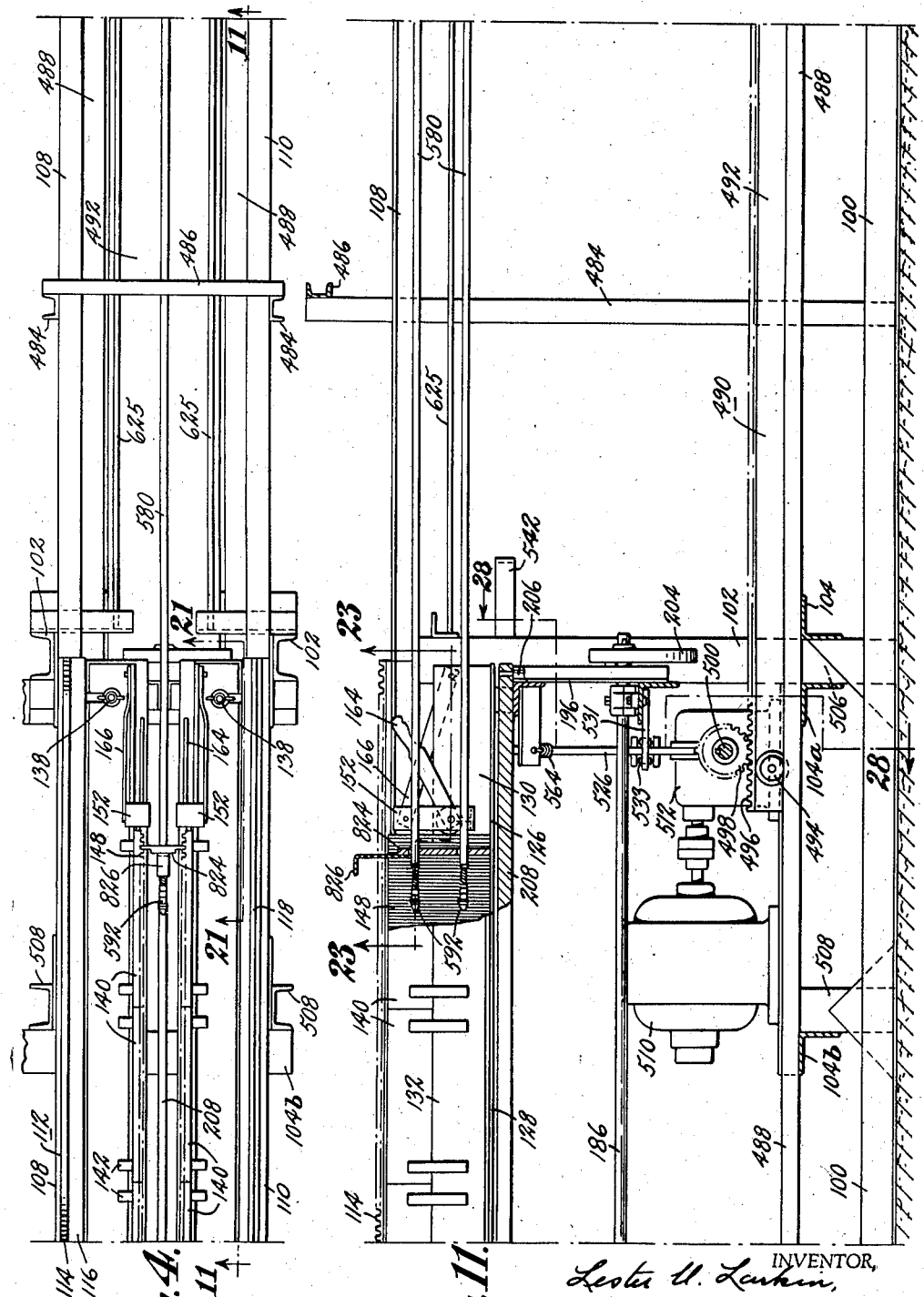

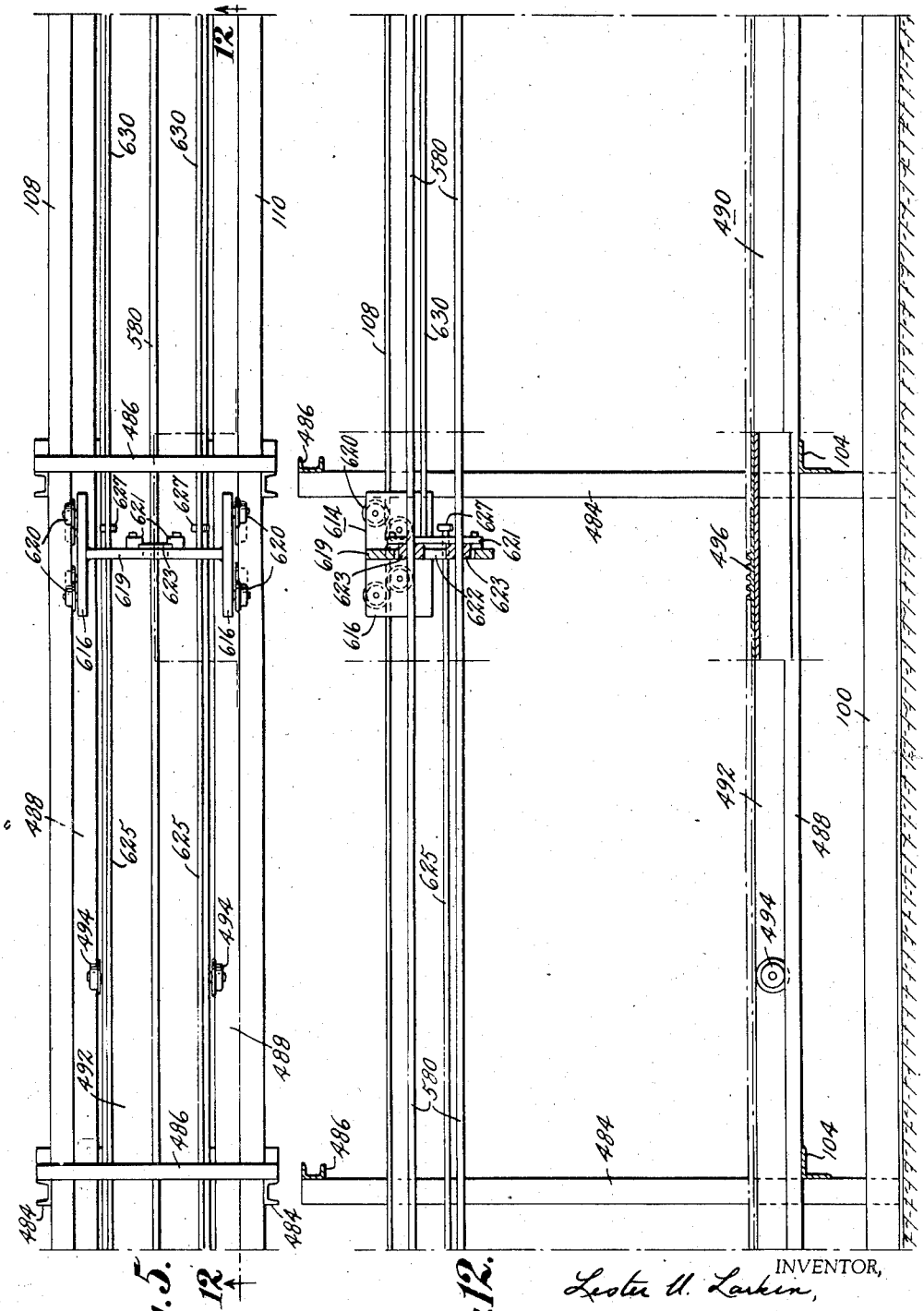

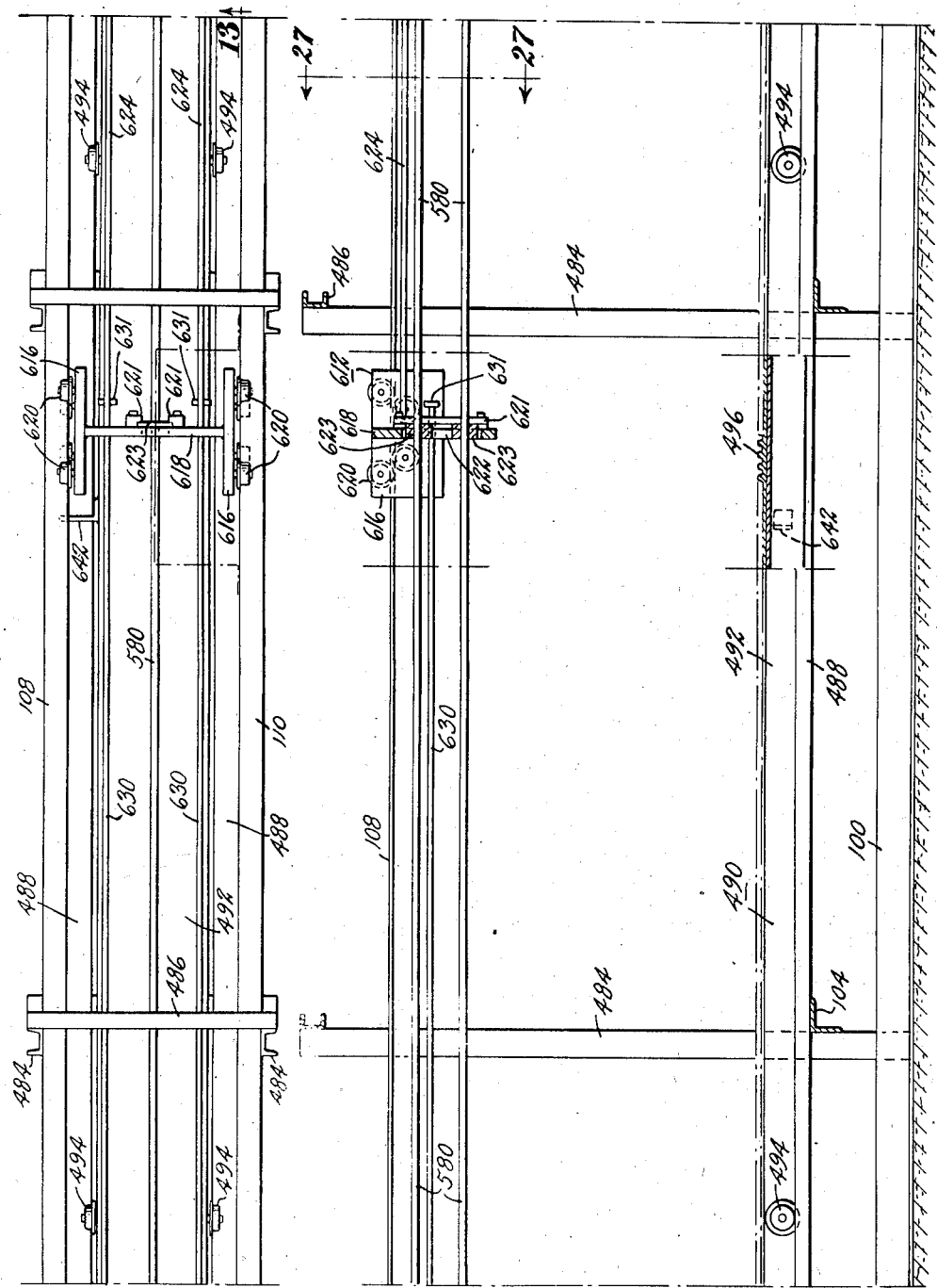

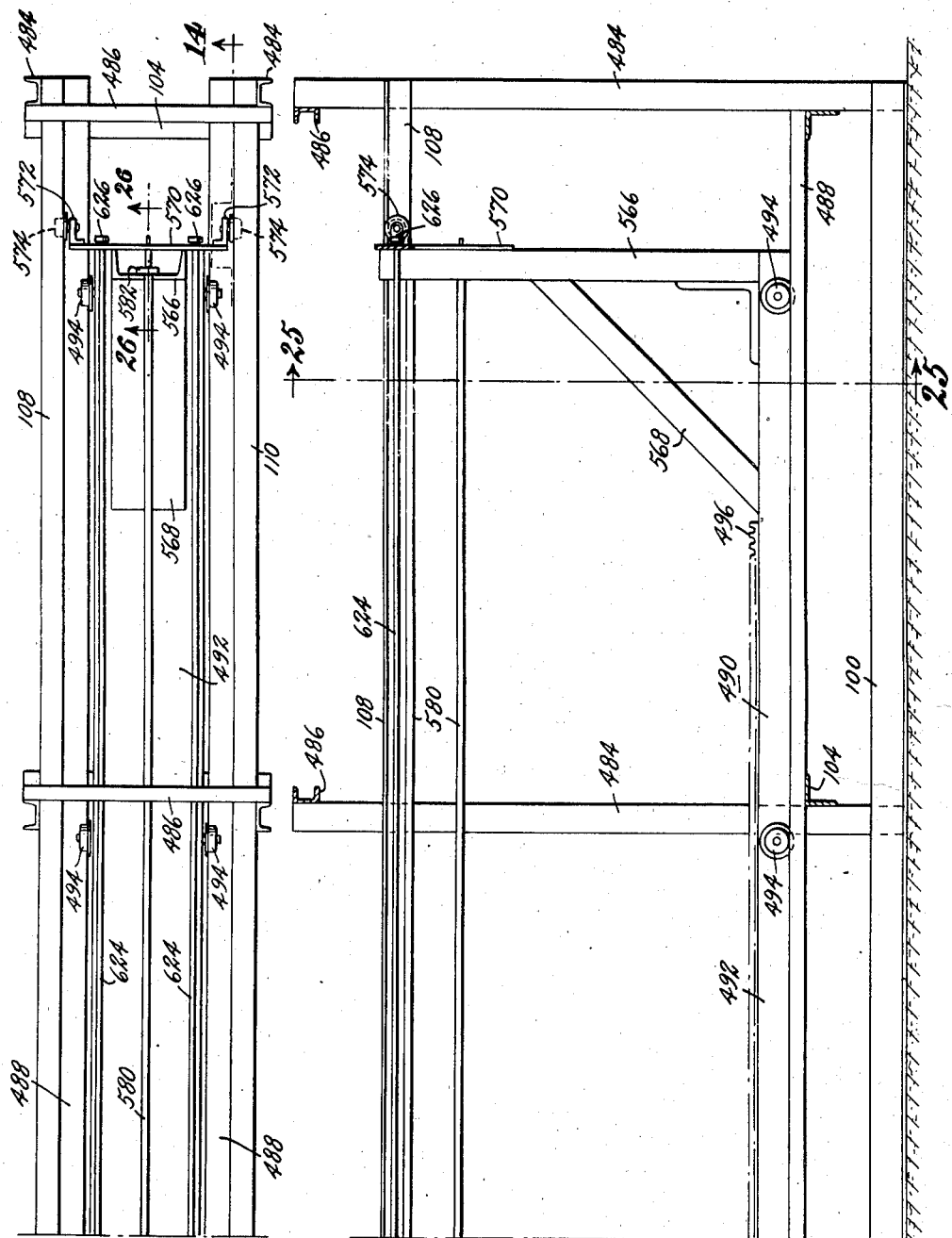

July 10, 1945.  L. U. LARKIN  2,379,973
APPARATUS FOR THE MANUFACTURE OF FINNED STRUCTURES
Original Filed March 19, 1938   11 Sheets-Sheet 8
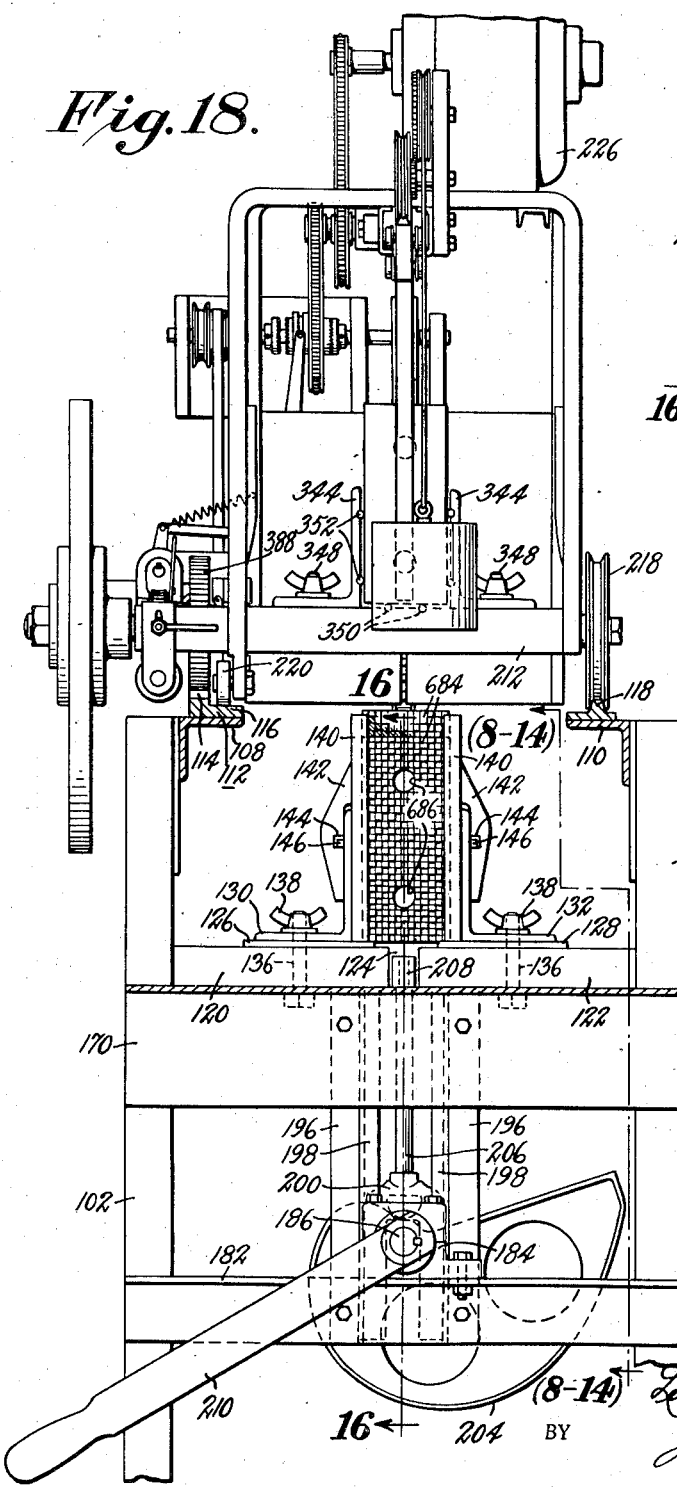
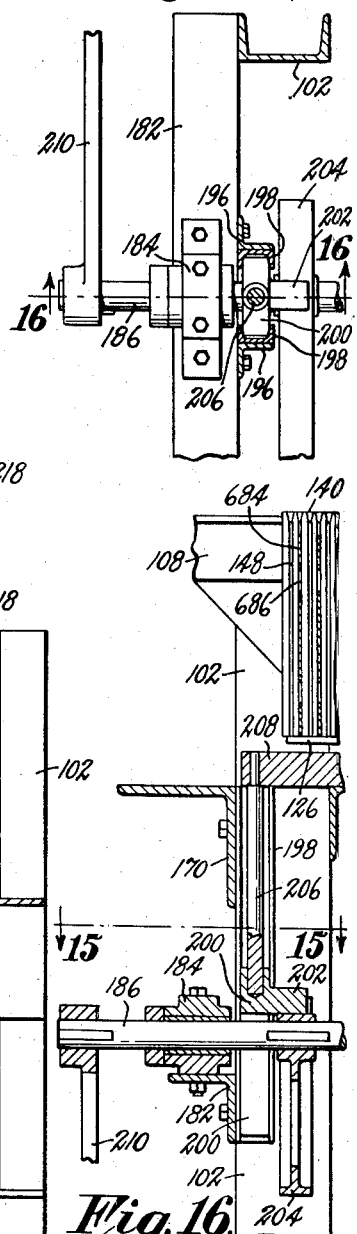

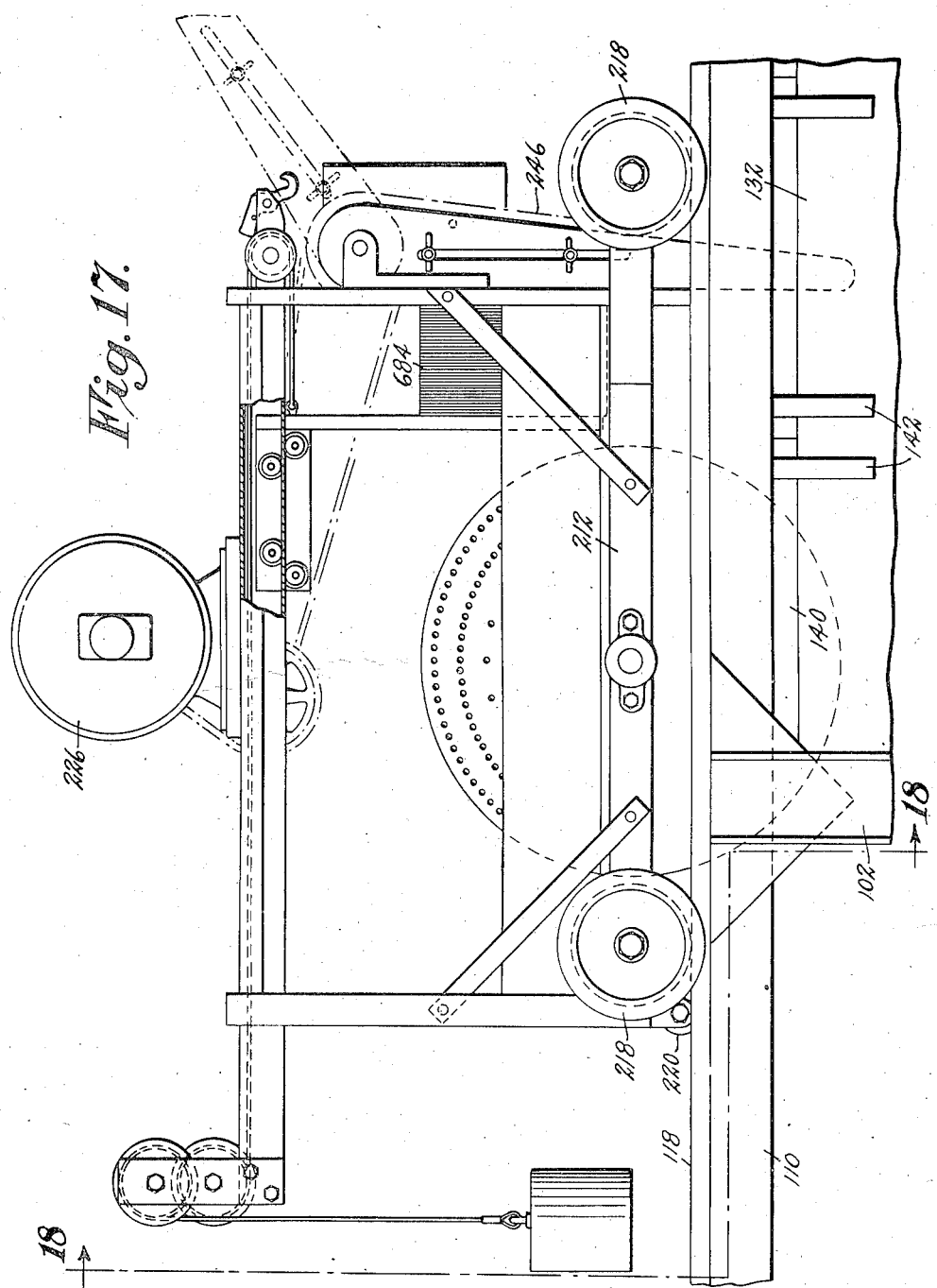

July 10, 1945. L. U. LARKIN 2,379,973
APPARATUS FOR THE MANUFACTURE OF FINNED STRUCTURES
Original Filed March 19, 1938 11 Sheets-Sheet 10
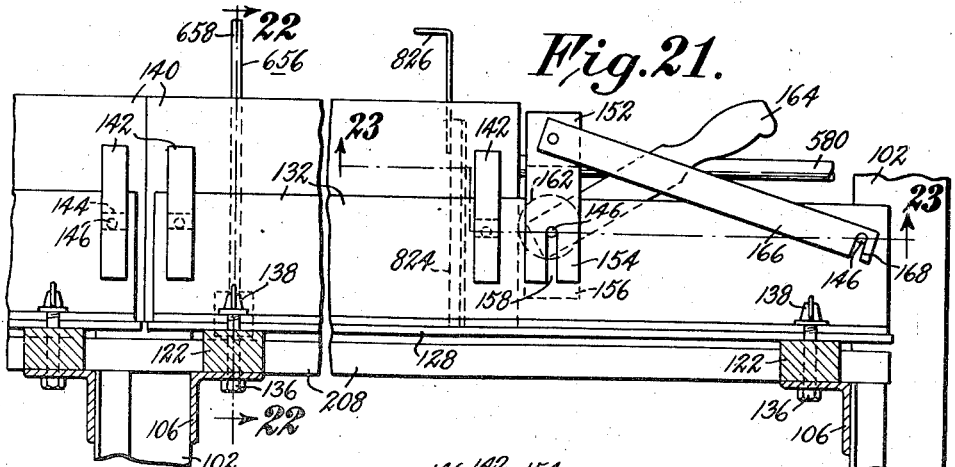
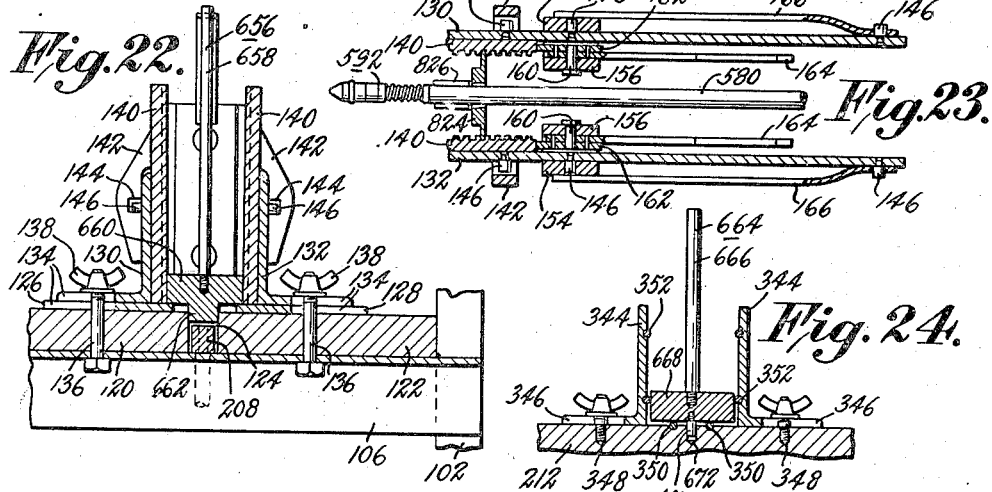
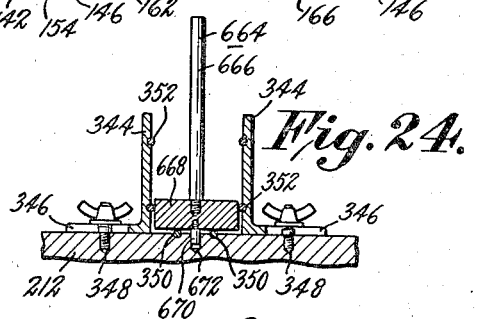
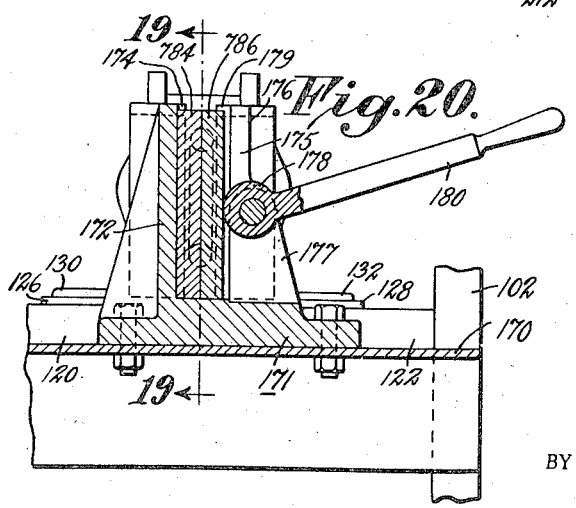
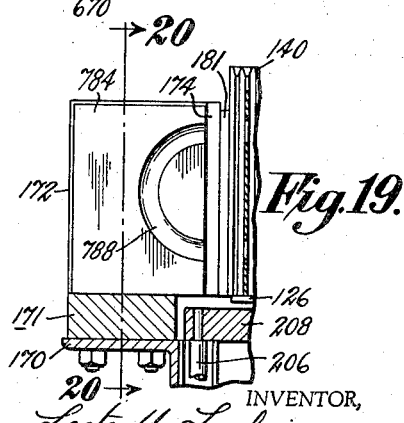
INVENTOR,
Lester U. Larkin,
BY
ATTORNEY.

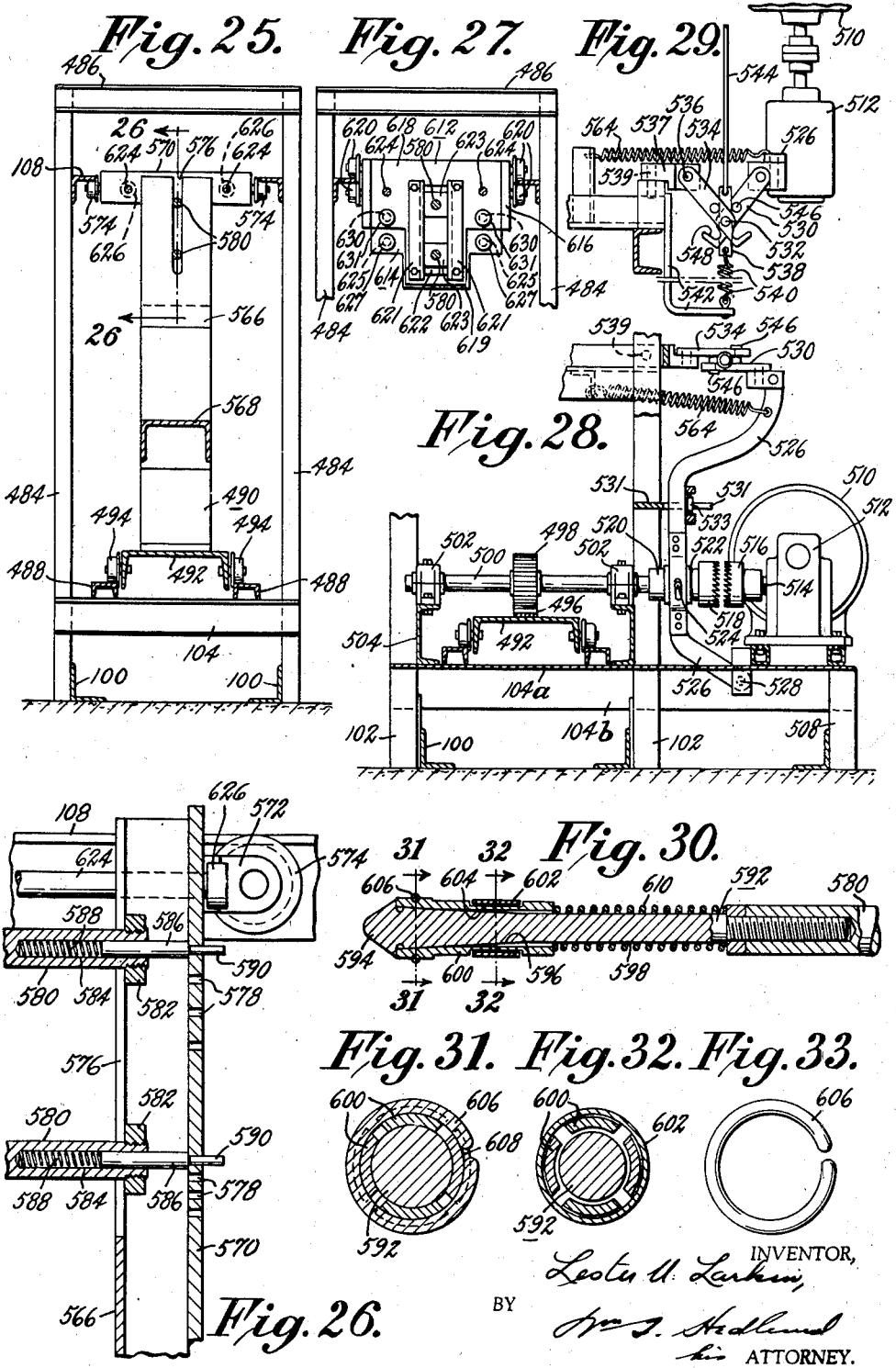

Patented July 10, 1945

2,379,973

UNITED STATES PATENT OFFICE 2,379,973

APPARATUS FOR THE MANUFACTURE OF FINNED STRUCTURES

Lester U. Larkin, Chicago, Ill., assignor to Lul Products, Inc., Baltimore, Md., a corporation of Maryland Original application March 19, 1938, Serial No. 196,881. Divided and this application July 26, 1941, Serial No. 404,105

10 Claims. (Cl. 153—80.5)

This application is a division of my copending application Serial No. 196,881, filed on March 19, 1938, Patent No. 2,258,618, issued October 14, 1941. My invention relates to the art of automatic machines. More specifically, my invention relates to an improved apparatus for the manufacture of an improved finned heat exchange coil, particularly adapted for use as an evaporator in a mechanical refrigerating system.

Among the objects of my invention is to provide automatic machinery for manufacturing finned coils and like structures, which is relatively easy to operate and does not require skilled labor, may be operated by a single operator with minimum attention, may be readily assembled or disassembled for shipment, may be installed in a small space, has relatively small floor load, does not require special or expensive foundations, requires but a small amount of power for operation, and is capable of rapidly manufacturing finned coils of any desired dimensions of coil length, fin size and fin spacing in a room having normal ceiling height.

Commercial refrigerators are constructed in a multitude of sizes and shapes and are used for many different purposes requiring different temperature levels, and as a result it has become the established practice in the industry for the cabinets and the evaporator coils to be made by different manufacturers. Consequently after the various factors affecting the size of the evaporator have been determined for each individual installation, the proper coil is ordered from a coil manufacturer, who maintains a factory for making coils. This not only entails delays incident to shipping, but involves additional expense, as a completed coil is bulky and must be carefully created in order to avoid damage.

However, due to its low cost and simplicity of operation, an automatic machine in accordance with my invention may be supplied to a dealer or jobber, whereby he may construct coils of various shapes and sizes as they are required for each installation. In this way, not only is there considerable saving in time, but freight costs are materially reduced as the parts necessary for the construction of a coil may be shipped much cheaper than a completed coil.

Further objects of my invention are to provide, in a machine of the type above referred to, improved means for holding a tube in position extending through apertures in fins which are retained in spaced relationship, improved means for expanding the tube within the apertures, and improved means for removing the tube and fins from the retaining means.

A further object of my invention is to provide an improved tube expander, an improved mechanism for moving the expander into and out of the tubes, including automatic means for stopping the movement of the expander in both directions of travel, and improved supporting means for intermediate points of the rods which carry the expanders.

Further objects and advantages of my invention will be apparent from the following description considered in connection with the accompanying drawings which form a part of this specification. In the description, the various elements have in general been given more or less specific terms in order that the description may be more readily understood, but it is not intended that any specific terminology shall limit the scope of the disclosure and the specific terms are intended to include all equivalent elements.

As will appear more in detail hereinafter the machine in accordance with my invention may be said to include four principal parts, namely, a main frame, a run-out frame, a fin depositing carriage and tube expander mechanism. The frames are preferably made of structural steel, the run-out frame being a continuation of the main frame. The fin depositing carriage is arranged to travel on the main frame, while the expander mechanism moves along both frames. The particular fin depositing mechanism herein illustrated and briefly described forms no part of the invention claimed herein, being claimed in my copending application Serial No. 196,881, and could be replaced by other apparatus performing similar functions.

Suitably supported along the main frame are spaced substantially parallel comb members forming a comb trough. The fin depositing carriage is mounted to travel on a track carried by the main frame, the track being so arranged that the carriage travels over the comb trough. A rack is also secured to the main frame and is engaged by a pinion on the carriage, there being an electric motor on the carriage for driving the pinion, which consequently causes the carriage to travel on the track. The carriage also includes a fin magazine and means operated by the electric motor for transferring one fin at a time from the magazine to the comb trough. Automatic mechanism is provided for alternately connecting the motor with the fin transferring mechanism and with the pinion for driving the carriage, whereby a fin is transferred to the comb trough, the carriage is caused to travel a predetermined distance, another fin is deposited in the comb trough, and so on. This results in a series of fins being deposited in spaced relationship in the comb trough.

The fins are formed with one or more apertures through which tubing is inserted after the fins have been transferred to the comb trough and while the fins are still retained in parallel position therein. Clamping means is provided on the main frame for retaining such tubing against lengthwise displacement with respect to the fins.

The tube expander mechanism includes a puller head which is mounted to run on a track which extends substantially the entire length of both the main and run-out frames, to which head is attached one or more expander rods. The puller head is caused to travel along its track by any suitable means, such as by a pinion rotating about a fixed axis and engaging a rack carried by the puller head. The pinion may be driven in either direction, as by a reversible electric motor, or through the medium of a reversing gear.

The expander rods connected to the puller carry tube expanders which are introduced into the tubes held in position within the apertures of the fins by causing the puller head to travel in a direction from the run-out frame toward the main frame. The tube expanders are so constructed that they do not expand the tubes while being introduced thereinto. Upon a reversal of the direction of travel of the puller head so as to withdraw the expander from the tubes, the expanders are constructed to expand the tubes within the apertures of the fins, thus causing the fins to tightly grip the outer surfaces of the tubes.

Automatic means are provided for controlling the travel of the puller head in both directions so as to stop the travel of the puller head when the expanders have been fully introduced into the tubes and to stop the travel of the puller head in the opposite direction after the expanders have been withdrawn from the tubes. Mounted to run on a track carried by the run-out frame are trolleys for supporting intermediate points of the expander rods for the purpose of preventing undue sagging of these rods when they are withdrawn from the tubes.

The main frame also supports a lifting bar for removing the fins and tubes after the latter have been expanded so as to form with the fins an integral unit.

The above, and other related apparatus, is described hereinafter in detail, and is illustrated in the accompanying drawings, of which:

Figs. 1 through 7 constitute a top view of the frame of the main machine for manufacturing finned coils;

Figs. 8 through 14 are cross-sectional views taken on the corresponding section lines of Figs. 1 through 7, respectively, and each figure is taken on the line (8—14)—(8—14) of Fig. 18;

Fig. 15 is a cross-sectional view taken on the lines 15—15 of Fig. 8 and Fig. 16;

Fig. 16 is a cross-sectional view taken on the line 16—16 of Fig. 15;

Fig. 17 is a side view of the fin depositing carriage mounted on the frame;

Fig. 18 is a rear end view of the carriage, the frame being shown in section along the line 18—18 of Fig. 17;

Fig. 19 is a cross-sectional view taken on the lines 19—19 of Figs. 1 and 20, but includes certain structure not shown in Fig. 1;

Fig. 20 is a cross-sectional view taken on the lines 20—20 of Figs. 8 and 19, but includes certain structure not shown in Fig. 8;

Fig. 21 is a cross-sectional view taken on the line 21—21 of Fig. 4;

Fig. 22 is a cross-sectional view taken on the line 22—22 of Fig. 21;

Fig. 23 is a cross-sectional view taken on the lines 23—23 of Figs. 11 and 21;

Fig. 24 is a cross-sectional view showing a detail of the carriage illustrated in Figs. 17 and 18;

Fig. 25 is a cross-sectional view taken on the line 25—25 of Fig. 14;

Fig. 26 is a cross-sectional view taken on the lines 26—26 of Figs. 7 and 25;

Fig. 27 is a cross-sectional view taken on the line 27—27 of Fig. 13;

Fig. 28 is a cross-sectional view taken on the line 28—28 of Fig. 11;

Fig. 29 is a top view of the device shown in Fig. 28;

Fig. 30 is a cross-sectional view of an expander;

Fig. 31 is a cross-sectional view taken on the line 31—31 of Fig. 30;

Fig. 32 is a cross-sectional view taken on the line 32—32 of Fig. 30; and

Fig. 33 is an end view of a ring forming part of the expander head.

The main frame

The main frame, which is illustrated in top view in Figs. 1, 2, 3, and a portion of Fig. 4, and in cross-section in Figs. 8, 9, 10, and a portion of Fig. 11, is of a length equal to the longest coil which it is desired to manufacture by the machine, plus the length of the fin depositing carriage, and of a clamping device. Figs. 1 through 7 and 8 through 14 are respectively continuations of each other. That is, by abutting Figs. 1 through 7 a complete top view of the entire frame is obtained. The main frame is preferably made of structural steel and includes a pair of parallel angles 100 which are suitably secured to a floor or other foundation. Secured to angles 100 at suitable intervals are vertically extending channels 102. Corresponding channels 102 on opposite sides of the frame are connected by cross-angles 104 a short distance above the floor, and similar cross-angles 106 near their upper ends. Extending longitudinally of the frame and secured to the inner sides of channels 102 are angles 108 and 110. Mounted on the horizontal leg of angle 108 is a member 112 having a rack 114 extending along one side of its upper surface and a track 116 extending parallel to the rack. Angle 110 carries a track 118.

Secured to the horizontal flanges of angles 106 in any suitable manner, as by welding, are pairs of blocks 120 and 122 (see particularly Figs. 18 and 22), the inner ends of which are spaced apart to leave a space 124. Supported on blocks 120 and 122 are longitudinally extending plates 126 and 128. These plates have secured thereto, as by welding, longitudinally extending angles 130 and 132. The plates are adjustable in a transverse direction so as to permit variation in the space between the angles. For this purpose the plates and the horizontal flanges of the angles are provided with transverse slots 134 through which extend bolts 136 which are anchored in the angles 106 and the blocks 120 or 122. Bolts 126 are provided with wing nuts 138 which may be tightened against the horizontal flanges of angles 130 and 132 to retain these angles in desired positions. The plates and angles carried thereby are of equal length, which is approximately the distance between adjacent channels 102. The upwardly extending flanges of angles 130 and 132 are slightly inclined outwardly from the vertical and serve to support comb sections 140. Each section is comparatively short and is provided on its outer side adjacent to each end with a bracket 142 which is adapted to embrace the outer surface of the vertical flanges on angles 130 or 132. Each of these brackets is formed with a recess 144 adapted to receive pins 146 which protrude outwardly from the vertical flanges of angles 130 and 132. The inner faces of combs 140 are formed with equally spaced grooves 148. Due to the inclination of the flanges of angles 130 and 132, opposite comb sections are further apart at the top than at the bottom. The spacing of these grooves is the same as the closest spacing desired of the fins on the coil which is to be manufactured by the machine. If desired, a plurality of sets of comb sections having different groove spacings may be provided.

An angle 170 is secured transversely between the second pair of channels 102, counting from the left toward the right in Figs. 1 and 8. Bolted to the horizontal flange of angle 170 is a member 171 (Figs. 19, 20) including a fixed clamping plate or wall 172, which is formed with an inturned lip or abutment 174. Member 171 also includes a slotted plate or wall 176 from the side of which extend arms 177 between which is journalled a cam 178 which projects through the slot 175 (Figs. 1, 20) in plate 176. The cam is formed with a handle 180 for rotating it. Plate 176 is formed with an abutment 179. Bearing plates 181 are secured to the ends of plates 172 and 176. The purpose of this clamping device will be explained later in the description of the operation of the machine.

The comb sections 140 are clamped in place by means of clamping devices shown in Figs. 4, 11, 21 and 23. There is one clamping device for the comb sections supported by angles 130 and a similar clamping device for the comb section supported by angles 132. Each clamping device includes a forked member 152 having parallel spaced legs 154 and 156, which are adapted to straddle the vertical flanges of angles 130 and 132. The outer leg 154 is provided with a vertically extending slot 158 which slides over one of the pins 146 carried by the flanges. The inner leg 156 carries a pin 160 on which is rotatably mounted a cam 162, which may be rotated by means of a handle 164. Secured to the upper end of member 152 is an arm 166, the opposite end of which is formed with a slot 168 adapted to engage another of the pins 146. When the clamping device is in the position shown particularly in Fig. 21, the cam 162 contacts the end of the last comb section 140 and, if the handle 164 is raised, the cam tends to displace the comb section to the left. The ends of the several comb sections are in contact with each other, and the end of the last comb section at the other end of the frame is in contact with the bearing plates 181. Consequently, when the cam 162 is rotated in the above manner, it serves to clamp all of the comb sections together. The brackets 142 on the comb sections hold them in a vertical position and the pins 146, which engage within the recess 144 in the brackets 142, prevent the comb sections from being raised. If it is desired to remove the sections, the cam 162 is rotated so as to loosen them, whereupon the clamping device may be removed by lifting it off the pins 146. Thereupon, the individual comb sections, starting at the right as viewed in the figures, may be slid a sufficient distance to the right so that the pins 146 are no longer disposed within the recess 144 in the brackets 142, whereupon each comb section may be lifted off. If it is not desired to make use of the entire length of the machine, only a portion of the total number of comb sections need be used, and the clamping device for the comb sections may be placed anywhere along the flanges 130 and 132, that is, with the slots 158 and 168 of the clamping device in engagement with any adjacent pair of pins 146.

Secured to opposite channels 102 at an elevation between cross angles 104 and 106 are additional cross angles 182 to which are bolted bearings 184 for a longitudinally extending shaft 186. Shaft 186 is made in two sections which may be joined together by means of a coupling 188 shown in Fig. 10. The coupling comprises a sleeve which is permanently secured to one section of the shaft by means of a fixed pin 190 and may be secured to the other section by means of a removable pin 192. A chain 194 is preferably provided for preventing loss of the pin 192 when it is removed from the coupling so as to disconnect the two portions of the shaft.

Extending vertically from the cross angles 182 are pairs of spaced angles 196. The upper ends of the pair of angles 196 adjacent to the left hand end of the frame, as viewed in the figures, are secured to cross angle 170, as is shown in Figs. 1, 8, 15, 16 and 18. The upper ends of the remaining pairs of vertical angles 196 are secured to cross angles 106 as is shown, for instance, in Fig. 10. Vertical angles 196 carry vertically extending guide channels 198 between which is slidably disposed a block 200 having a cam contacting projection 202 extending from one side of it (to the right as shown in Fig. 16) and beyond the guide channels 198. Secured to shaft 186 is a cam 204 which is contacted by projection 202 so that, when the cam is rotated in a clockwise direction, as shown in Fig. 18, the block 200 will be raised. Secured to block 200 is a rod 206 which extends upwardly therefrom and is secured to a longitudinally extending bar 208, which normally extends through the spaces 124 between the pairs of blocks 120 and 122. It will be noted that there is a cam 204 secured to shaft 186 adjacent to each of the vertical channels 102 of the main frame, and that the bar 208 extends the entire length of the main frame. However, the bar 208 is made in two sections (see Fig. 10), as is the shaft 186. Consequently if the second section of the shaft is uncoupled from the first, only the first section of the bar 208 will be raised upon rotation of the shaft. A handle 210 keyed to the left hand end to the first section of shaft 186 is provided for rotating the shaft.

The fin depositing carriage

The fin depositing carriage is shown in Figs. 17, 18 and 24, but it will be described but briefly, inasmuch as it is not claimed herein, and reference may be had to my aforesaid Patent No. 2,258,618 for a complete description of its construction and mode of operation.

Briefly, it consists of a base plate 212 which is mounted on flanged wheels 218 adapted to run on track 118, and with rollers 220 which are adapted to run on track 116. The plate 212 carries a fin magazine including angle members 344 movably secured to the plate by means of thumb screws 348 which engage slots 346. Smooth rods 350 and 352 are embedded in the plate 212 and the inner surfaces of the angles 344 in order to support the fins in the magazine with a minimum of friction. The proper spacing of the angles 344 for a given size of fin may be obtained by means of the tool 664 (Fig. 24). This includes a handle 666 on which is mounted a gauge 668 to determine the spacing. A pin 670 extending from the bottom face of the gauge is adapted to enter a recess 672 in plate 212 in order to assure correct centering of the angles 344.

An electric motor 226 is mounted on a frame work carried by plate 212 and through suitable gearing may be intermittently connected to a fin depositing chain 246, the function of which is to remove one fin at a time from the magazine and deposit it in a pair of grooves 148 of the combs 140. After each fin is deposited, the motor is automatically disconnected from chain 246 and connected to drive a gear 388 which meshes with the rack 114 on the main frame. Rotation of this gear serves to advance the carriage along the tracks 116 and 118 a predetermined distance, whereupon the motor is automatically disconnected from the gear 388 and again connected to chain 246 to deposit another fin in spaced relationship to the previously deposited fin. As a result of the operation of this carriage, a series of fins 684 are deposited in the grooves 148, with the apertures 686 in the fins in alignment.

The run-out frame

Connected to and forming an extension of the main frame is a run-out frame, which is shown in the right hand portions of Figs. 4 and 11, and in Figs. 5, 6, 7, 12, 13 and 14. Angles 100 of the main frame are continued throughout the length of the run-out frame, as are angles 108. Vertically extending channels 484 connect angles 100 and 108, and these channels extend above angles 108, where the channels on opposite sides of the run-out frame are connected by transverse channels 486. Transverse angles 104 connect the lower portions of the channels 484. Secured to angles 104, as by welding, are spaced parallel channels 488 (Figs. 25 and 28) which serve as tracks on which run a puller head, designated generally by reference character 490.

The puller head includes a channel 492 of a length substantially equal to that of the run-out frame. The flanges of the channel support flanged rollers 494 which run on the tracks formed by channels 488. Secured to the back of the web of channel 492 is a rack 496, which extends the entire length of the channel. This rack is engaged by a pinion 498 secured to a shaft 500 mounted in stationary bearings 502 which are supported on the upper horizontal flanges of short channel pieces 504. Channels 504 are supported on the transverse angle 104a which extends transversely between the two vertical channels 102 which are located at the juncture of the main frame and the run-out frame. Angles 104a differ from the other angles 104 by being extended beyond the side of the frame to form a portion of a motor base. The extended end of angle 104a is supported by means of a channel 506 extending to the floor. A similar angle 104b is secured to channels 488 at some distance from angle 104a and forms another portion of the motor base. The extended end of angle 104b is likewise supported by means of a channel 508.

Mounted on the base formed by angles 104a and 104b is an electric motor 510 and a gear reduction box 512. A power shaft 514 extends from the side of gear box 512 in axial alignment with shaft 500. Shaft 514 carries one member 516 of a dog clutch. The other member 518 of the clutch is keyed to shaft 500, but is axially slidable thereon. Mounted in an annular groove formed in the shank 520 of clutch member 518, is a clutch collar 522 with respect to which the shank 520 is rotatable. Collar 522 carries pins 524 which engage in slots formed in a clutch throw arm 526. The lower end of arm 526 is pivoted at 528 to the motor base, while the upper end is pivotally connected to one end of an arm 530 of a toggle mechanism. The opposite end of arm 530 is pivotally connected at 532 to the other arm 534 of the toggle, which other arm is pivoted at 536 to a member 537. Member 537 is pivoted on a horizontal pin 539 to a fixed member on the frame. A bar 538 is secured to the pivot pin 532 of the toggle. A tension spring 540 is connected between one end of bar 538 and a bracket 542 fixed to the frame. A cable 544 has one end connected to bar 538 and extends the entire length of the main frame, and has its other end anchored to the transverse angle 106 (Fig. 8) at the far end of the main frame. Arms 530 and 534 of the toggle are provided with pins 546 (Fig. 29) which contact the bar 538 to limit movement of the toggle arms in one direction, and which engage in recesses 548 formed in the ends of the arms to limit their movement in the opposite direction.

A forked retaining guide 531 extends from the frame on either side of arm 526. Rollers 533 are suitably mounted on arm 526 and roll on inner surfaces of the forked guide. This structure serves to limit movement of arm 526 to a plane transverse of the frame.

Motor 510 may rotate in either direction and a three-position switch 550 (Fig. 3) is connected in the motor circuit and is mounted on one of the channels 102. Switch 550 is formed with an operating shaft 551 which carries a switch arm 552 to which is connected a rod 554 which extends the entire length of the main frame and is slidably supported in eye bolts 556. When the switch arm 552 is in a central position, the motor circuit is open. When the arm is pivoted to one side of this position, the motor rotates in one direction, while if the arm is pivoted to the other side the motor rotates in the opposite direction.

The teeth on the dog clutch members 516 and 518 are formed with inclined faces on one side and straight faces on the other side. Consequently, when the direction of rotation is such that the inclined faces of the teeth are transmitting the torque, there is a tendency for the teeth to be forced out of mesh, whereas when the straight sides of the teeth are transmitting torque, there is no such tendency. A tension spring 564 is connected between the upper end of clutch throw arm 526 and the frame and tends to disengage the clutch at all times.

The right hand end of the puller head as viewed in Figs. 7 and 14, includes a vertically extending channel 566 which is braced by an inclined channel 568. Welded to the flanges at the upper end of channel 566 is a plate 570 which carries angle brackets 572 on which are rotatably mounted flanged rollers 574. These rollers engage underneath the horizontal flanges formed on angles 108 of the run-out frame.

The upper end of the web of channel 566 is formed with a slot 576 (Fig. 25) and plate 570 is formed with a plurality of spaced apertures 578 in alignment with slot 576. A pair of expander rods 580 have nuts 582 threaded on their ends. Rods 580 are formed with bores 584 (Fig. 26) in which are slidably received pins 586, compression springs 588 being located in the bores. Pins 586 are formed with ends 590 having a reduced diameter substantially equal to the diameter of holes 578. The expander rods 580 may be slid downwardly into slot 576, with the pin 586 retracted. These pins are then inserted in the proper holes 578 so as to give the desired vertical spacing of the expander rods.

The expander rods are somewhat longer than the run-out frame and at their opposite ends are tapped to receive expander heads 592 (Fig. 30). Each expander head, as shown in Fig. 30, includes a conical end 594, a tapered shank portion 596, and a straight cylindrical shank portion 598. Arranged around the shank portions are a plurality of cylindrical segments 600 retained in place by means of a ring 602 engaging within an annular groove 604. The forward ends of segments 600 are enlarged and carry a ring 606 of hardened wire which is received in a groove 608 and which extends radially beyond any other portion of the expander head. A compression spring 610 is disposed around the straight shank portion 598 and between the end of the expander rod 580 and the ends of the segments 600. This spring tends to force the segments toward the enlarged portion of the tapered shank 596 and against a shoulder formed behind the conical end 594.

A pair of trolleys 612 and 614 (Figs. 13, 14) are provided for supporting intermediate points of the expander rods 580. Each trolley includes side plates 616 secured together by means of a transverse plate. As seen in Fig. 27, the transverse plate 618 of trolley 612 is of different shape and extent than plate 619 of trolley 614. The side plates carry flanged rollers 620, one pair of which run on the upper side of the horizontal flange of angles 108 of the run-out frame, and the other pair of which engage underneath these flanges. Transverse plates 618 and 619 are formed with slots 622. Bolted to one side of each plate are members 621 extending along the sides of the slots and forming with the plate vertical grooves. Two blocks 623 are disposed in each slot and are provided with vertical flanges slidable in the grooves. Each block is formed with an aperture through which extends an expander rod 580, the blocks thus serving to support the rods while permitting limited vertical movement thereof.

Fixed to the frame at the juncture of the main and run-out portions is a pair of tie rods 625, the opposite ends of which are formed with heads 627. These rods slide through apertures formed in transverse plate 619 of trolley 614. These tie rods have a length approximately one-third of the length of the run-out frame. A pair of similar tie rods 630 are fixed to plate 619 above the apertures for rods 625. The opposite ends of rods 630 are provided with heads 631 and these rods slide in apertures formed in plate 618 of trolley 612.

Fixed to the transverse plate 618 of trolley 612 above the apertures for rods 630 are tie rods 624. These rods likewise have a length approximately one-third the length of the run-out frame and slidably extend through holes in plate 570 of the puller head. Rods 624 are provided with heads 626 which limit relative movement between the rods and the puller head.

The operating shaft 551 of switch 550 (Fig. 3) is provided with a downward extension 636 (Fig. 10), the lower end of which is rotatably supported in a bracket 638 and carries a horizontal arm 640. A bracket 642 (Figs. 6, 13) is secured to the side of channel 492 of the puller head in a position such that it strikes arm 640 as the puller head moves into the main frame. Bracket 642 is so positioned lengthwise of channel 492, with regard to the position of arm 640, that the bracket strikes the arm to open switch 550 and stop the puller head in a position such that the expander heads are at the end of the trough formed by comb sections 140.

Operation of the fin depositing carriage

The fins 684 are made of comparatively thin sheet metal formed with pockets as is shown in Fig. 18. The fins are formed in a separate punch press operation. The dishing of the fin plates is symmetrical so that the fins have an overall width materially greater than the thickness of sheet used. The pockets or indentations may be of any desired shape and may cover the entire surface of the fin. As shown they are square. Also, the fins are formed with two spaced apertures 686 (Fig. 18) located on the vertical center line of the fin. The diameter of these apertures is slightly greater than the original diameter of the tube to which the fins are later to be secured. The fins are preferably supplied stacked in packages including cardboard tubes extending through the apertures 686. Wooden plugs having enlarged heads may be inserted in the ends of the tubes to retain the fins in place thereon. The plugs in at least one of the tubes are easily removable and are preferably marked "Front," indicating that this end of the stack is to be placed toward the front in the fin magazine of the fin depositing carriage.

To load the magazine of the fin depositing carriage, the flanges 344 (Fig. 24) forming the sides of the magazine are adjusted to the proper spacing for the size of the fins which it is desired to use, as has been previously described. The magazine is then loaded placing a package of fins, from which the plugs in the front ends of the cardboard tubes have been removed, in the magazine, the fins standing vertically on edge and being supported by the rods 350 in the bottom of the magazine. The cardboard tubes are then removed by withdrawing them rearwardly.

The fin depositing carriage is placed at left end of the main frame and the electric motor 226 is started. As previously described, the mechanism of the carriage operates to automatically deposit a series of fins in the grooves 148. However, as far as the present invention is concerned, it is immaterial how the fins are placed in these grooves, and this step could be performed by hand, or with the aid of the device shown in my Patent No. 2,218,115 granted October 15, 1940.

Fabrication of finned hairpins

A return bend is soldered or otherwise secured to the ends of the straight tubing 688 to form what is termed a hairpin. The hairpin is then inserted into the aligned openings 686 of the fins 684 which are secured in spaced relationship in the grooves 148 of the combs 140. The hairpin is inserted until the return bend thereof is a short distance to the left of the clamping device 171 shown in Fig. 8. Two holding blocks 784 and 786, having semi-circular grooves 788 in their mating surfaces, as is shown in Figs. 19 and 20, are then placed around the return bend, the return bend being thus disposed within the groove 788. The hairpin with the holding blocks 784 and 786 secured around the return bend is then slid further to the right until the blocks are within the clamping device 171. Lever 180 is then rotated in a counter-clockwise direction, as shown in Fig. 20, so that cam 178 presses the holding block 786 against the block 784 and presses this latter block against the fixed clamping plate 172. The forward edge of blocks 784 and 786 abut against the inturned abutments 174 and 179, whereby further movement of the hairpin in this direction is prevented. The ends of the hairpin are now projected some distance beyond the last fin.

*Operation of the tube expanders*

The next step is to expand the tubes 688 within the holes 686 in the fins 684. To accomplish this the rod 554 (Figs. 1, 2, 3) is moved in the proper direction so as to throw switch 550 (Fig. 3) in the motor circuit 510 in the direction to cause the motor to rotate in a direction such that shaft 500 will rotate in a clockwise direction, as shown in Fig. 11. After the motor has started, cable 544 is pulled so as to straighten out the toggle links 530 and 534, thus moving the clutch arm 526 in a direction so as to engage the dog clutch members 516 and 518. The engagement of the clutch causes the shaft 500 to rotate in a clockwise direction, as viewed in Fig. 11, which in turn causes pinion 498, which engages rack 496, to move the puller head 490 to the left, as viewed in Fig. 11. Inasmuch as the expander rods 580 are secured to the puller head, they are caused to move in the same direction. The expander rods 580, while in the run-out frame, are supported at intermediate points along their length by means of the trolley 612 and 614 (Figs. 5, 6). If the length of the coil being constructed is comparatively short, its end will be spaced a considerable distance from the end of the run-out frame and it is necessary to provide means for supporting the expander rods at one or more places along the length of the main frame before they reach the ends of the coil. Such support is provided by a plate 824 (Figs. 4, 11, 23) which may be inserted in the comb trough. The central portion of the plate 824 is formed with apertures for guiding the expander rods 580. The vertical edges of the plate are comparatively thin so that they may be inserted in the grooves 148 of the comb sections 140. A handle 826 is provided for inserting and removing the supporting plate 824. None or one, or more of the supporting plates 824 may be employed, depending upon the distance between the end of the run-out frame and the end of the coil which is being manufactured. Several sets of plates 824 are provided, the plates of different sets being of different widths and having apertures spaced on different centers, corresponding to the difference between tube centers of the various hairpins which it is desired to manufacture in the machine.

As the puller head advances toward the left, the trolleys 612 and 614 support the expander rods 580 at intermediate points along their lengths. During the first part of this movement of the puller heads, the tie rods 624 slide in the brackets 626, the trolleys remaining stationary.

After the puller head has moved about one-third of the length of the run-out frame, it strikes the trolley 612 and this trolley is pushed along ahead of the puller head, the tie rods 630 sliding in the apertures in plate 618. When the trolley 612 strikes the trolley 614, the latter is pushed along, the tie rods 625 sliding in the apertures in the plate 619.

In the meantime the expander heads 592 have been guided into the open ends of the hairpin. When the expander heads first enter the tubes of the hairpin, the rings 606 thereof (Fig. 30) contact the inner walls of the tubes and the friction causes the segments 600 of the expander head to be slid from the conical portion 596 back to the cylindrical portion 598, against the force of spring 610. Inasmuch as the cylindrical portion is of less diameter than the conical portion, the expander heads pass through the tubes in this direction without expanding the tubes. The puller head and expander rods are moved to the left until the ends of the expander heads have passed beyond the last fin adjacent to the return bend 690. The motor 510 is then automatically stopped by the bracket 642 (Fig. 6) on the puller head channel 492 striking the arm 640 (Fig. 10) on shaft extension 636 of switch 550 to open the switch. The clutch between the motor and shaft 500 is then disengaged by the operator releasing cable 544 and rod 554 is then moved so as to cause the motor to rotate in the reverse direction. The clutch is again engaged by pulling on the cable 544, and consequently the shaft 500 is driven in a direction such as to move the puller head away from the main frame. It will be noted that, for this direction of rotation, the torque is transmitted through the straight axial faces of the teeth formed on clutch members 516 and 518. Consequently, there is no inherent tendency for the clutch to disengage. However, the force of springs 540 and 564 tend to disengage the clutch, but during the expanding operation the clutch transmits so much torque that the friction between the teeth on clutch members 516 and 518 is so great that the springs 538 and 564 are not able to disengage the clutch.

As the puller head withdraws the expander rods from the tubes, the friction between rings 606 on the expander heads and the interior of the tubes, causes the segments 600 to move up on the conical portion 596. In this position the outer diameter of ring 606 is greater than the original inner diameter of the tubes and as the expander heads move out of the tubes, the rings 606 expand the walls of the tubes and force the outer surface of each tube tightly against the material of the fins 684 surrounding the holes 686 therein.

As soon as the expander heads have been withdrawn from the ends of the tubes, the force required to move the puller head is greatly reduced and the torque transmitted through the clutch is reduced to such an extent that the springs 540 and 564 are able to disengage the clutch. Consequently, movement of the puller head is automatically stopped as soon as the expander heads have been withdrawn from the tubes, regardless of the length of the particular tubes being operated upon. After the clutch has been disengaged, the motor 510 runs idle until the operator interrupts its circuit by means of the switch rod 554. It will be noted that this switch rod and the cable 544 for operating the clutch extend the entire length of the main frame, whereby these elements may be controlled from any position along the main frame.

As the puller head moves out, the trolleys 612 and 614 may remain stationary near the end of the run-out frame until the puller head has traveled a distance equal to the length of tie rods 624. When the heads 625 on these tie rods are contacted by the part 570 of the puller head, the rods 624 are forced to travel with the puller head and consequently pull the trolley 612 along on the run-out frame. When the puller head has moved an additional distance equal to the length of tie rods 630, the heads 631 thereon are contacted by the plate 618 of the trolley 612 and rods 630 are caused to move with the trolley 612, thus pulling the trolley 614 along the run-out frame. It will be noted that, during both the in and out movement of the expander rods the greatest unsupported length of the expander rods in the run-out frame is equal to approximately one-third the length of the frame. This is sufficient to prevent buckling or undue sagging of these rods. Tie rods 625 between trolley 614 and the frame are provided to prevent the possibility of the trolleys moving all the way back with the puller head, due to friction on the tie rods 624 and 630.

After the expander rods have been withdrawn from the tubing, the handle 180 (Fig. 20) of the clamping device 171 is rotated so as to release the blocks 784 and 786. Thereupon, the finished hairpin, now consisting of the straight portions connected by means of the return bends and securely expanded against the fins 684, may be removed from the comb trough by rotating shaft 186 by means of handle 210 so that cams 204 raise bar 208. Bar 208 contacts the lower edges of the fins and also the lower edges of blocks 784 and 786 and hence raising of the bar lifts the hairpin upwardly.

It is to be understood that the foregoing description has been given for purposes of illustration only as showing preferred embodiments of the various structures in accordance with my invention, as is required by the patent statutes. It is not to be considered as limiting the scope of my invention, which is to be determined by the appended claims.

What is claimed:

1. In a machine for fabricating finned tubing, a frame, means carried by said frame and providing grooves for retaining apertured fins in spaced relationship and with the apertures aligned so as to receive a tube extending therethrough, means for securing the tubing to said frame so as to restrain the tubing against lengthwise displacement, means for expanding the tubing in the apertures against the fins, a bar carried by said frame and disposed beneath the fins in said retaining means, a shaft rotatably mounted in said frame below said bar, and cam means on said shaft operable upon rotation of the latter to raise said bar into contact with the bottom edges of the fins to remove the latter and the tube as a unit from the retaining means.

2. In a machine for fabricating finned heat exchangers, a frame, means for retaining fins in spaced relationship, each fin being formed with spaced apertures adapted to receive tubes extending therethrough, a carriage movably mounted on said frame and having a plurality of sets of spaced holes, a plurality of rods, tube expanders carried by said rods, and means for securing a rod in any selected hole of each set in order to vary the spacing between said rods to accommodate fins having differently spaced apertures.

3. In a machine for fabricating finned heat exchangers of different lengths, a frame, means for retaining apertured fins in spaced relationship and in a position to receive a tube of desired length extending through the apertures, a carriage movably mounted on said frame, a tube expander movable by said carriage, means for moving said carriage in a direction to advance said expander into said tube, means for moving said carriage in the opposite direction to withdraw said expander from said tube, and means for automatically stopping said carriage substantially immediately upon withdrawal of said expander from said tube, regardless of the length of the latter.

4. In a machine for fabricating finned heat exchangers of different lengths, a frame, means for retaining apertured fins in spaced relationship and in a position to receive a tube of desired length extending through the apertures, a carriage movably mounted on said frame, a tube expander movable by said carriage, an electric motor for driving said carriage, a clutch in the drive between said motor and said carriage, and means tending to disengage said clutch, said clutch including torque transmitting surfaces so arranged that the transmission of torque during withdrawal of said expander from said tube imposes a frictional resistance to disengagement, whereby said clutch remains engaged while under load during the withdrawal and is automatically disengaged by the last mentioned means when the load is relieved upon completion of the withdrawal, regardless of the length of said tube.

5. In a machine for fabricating finned heat exchangers, a frame, means for retaining apertured fins in spaced relationship and in a position to receive a tube extending through the apertures, a carriage movably mounted on said frame, an expander rod having one end secured to said carriage, a tube expander carried by the other end of said rod, said rod being arranged to be moved into said tube by said carriage, a trolley movable on said frame for supporting said rod between said carriage and said tube, and means for maintaining said trolley in spaced relationship with said carriage and said tube as said rod is moved.

6. In a machine for fabricating finned heat exchangers, a frame, means for retaining apertured fins in spaced relationship and in a position to receive a tube extending through the apertures, a carriage movably mounted on said frame, an expander rod having one end secured to said carriage, a tube expander carried by the other end of said rod, said rod being arranged to be moved into said tube by said carriage, a trolley movable on said frame for supporting said rod between said carriage and said tube, and tie rods slidably connecting said trolley to said frame and to said carriage for maintaining said trolley in spaced relationship with said carriage and said tube as said rod is moved.

7. In a machine for fabricating finned heat exchangers, a frame, means for retaining apertured fins in spaced relationship and in a position to receive a tube extending through the apertures, a carriage movably mounted on said frame, an expander rod having one end secured to said carriage, a tube expander carried by the other end of said rod, said rod being arranged to be moved into said tube by said carriage, trolley means movable on said frame for supporting said rod between said carriage and said tube, and tie rods slidably connecting said trolley means to said frame at a point adjacent to the end of said tube and to said carriage for maintaining said trolley means in spaced relationship with said carriage and said tube as said rod is moved.

8. In a machine for fabricating finned heat exchangers, a frame, means for retaining apertured fins in spaced relationship and in a position to receive a tube extending through the apertures, a carriage movably mounted on said frame, an expander rod having one end secured to said carriage, a tube expander carried by the other end of said rod, said rod being arranged to be moved into said tube by said carriage, a plurality of trolleys movable on said frame for supporting said rod between said carriage and said tube, and tie rods for slidably connecting said trolleys together and for slidably connecting one trolley to said frame and another trolley to said carriage for maintaining said trolleys in spaced relationship with each other and with said carriage and said tube as said rod is moved.

9. In a machine for fabricating finned heat exchangers, a frame, means for retaining fins in spaced relationship, each fin being formed with spaced apertures adapted to receive tubes extending therethrough, a carriage movably mounted on said frame, a pair of substantially parallel plates secured to said carriage, one of said plates being formed with an elongated slot and the other plate being formed with a plurality of holes in alignment with said slot, a plurality of rods extending through said slot, means to secure said rods to the plate with the elongated slot, the ends of said rods being receivable in selected ones of said holes to vary the spacing between said rods to accommodate fins having differently spaced apertures, and a tube expander carried by the opposite end of each rod.

10. In a machine for fabricating finned tubing, a frame, means carried by said frame for retaining apertured fins in spaced relationship, each fin having at least two apertures whereby a tubular hairpin may be inserted through said apertures, a pair of plates supported on said frame against longitudinal movement and having semi-circular mating recesses in their adjacent faces, means for forcing said plates towards each other for clamping the return bend of said hairpin to restrain the latter against longitudinal displacement, and means exerting a longitudinal pull on said hairpin for expanding the tubing thereof in the apertures against the fins.

LESTER U. LARKIN.